(12) United States Patent
Lee et al.

(10) Patent No.: US 12,271,612 B2
(45) Date of Patent: Apr. 8, 2025

(54) MULTI-DIMENSIONAL SOLID STATE DRIVE BLOCK ACCESS

(71) Applicant: Lemon Inc., Grand Cayman (KY)

(72) Inventors: Chul Lee, Los Angleles, CA (US); Ping Zhou, Los Angeles, CA (US); Hui Frankie Zhang, Los Angeles, CA (US); Fei Liu, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 18/108,351

(22) Filed: Feb. 10, 2023

(65) Prior Publication Data

US 2023/0195345 A1 Jun. 22, 2023

(51) Int. Cl.
*G06F 12/00* (2006.01)
*G06F 3/06* (2006.01)

(52) U.S. Cl.
CPC ............ *G06F 3/064* (2013.01); *G06F 3/0604* (2013.01); *G06F 3/0655* (2013.01); *G06F 3/0679* (2013.01)

(58) Field of Classification Search
None
See application file for complete search history.

(56) References Cited

U.S. PATENT DOCUMENTS

2016/0140356 A1* 5/2016 Tasher ..................... G06F 21/79
726/29
2018/0239697 A1 8/2018 Huang et al.
2019/0121548 A1 4/2019 Frolikov
2021/0241806 A1* 8/2021 Chawla ............... G06F 12/0207
2022/0206952 A1 6/2022 Yuan

OTHER PUBLICATIONS

NVM Express Inc., NVM Command Set Specification, Oct. 3, 2022, Revision 1.0c.
European Search Report for EP Patent Application No. 24155617.4, Issued on May 21, 2024, 12 pages.
Liu et al., "NDS: N-Dimensional Storage", MICRO '21, Oct. 17, 2021, pp. 28-45.

* cited by examiner

*Primary Examiner* — Daniel D Tsui
(74) *Attorney, Agent, or Firm* — Faegre Drinker Biddle & Reath LLP

(57) ABSTRACT

A method for accessing blocks of a solid state drive is described. A starting position is received, where the starting position identifies a first block of a contiguous block region within a namespace of the solid state drive. The contiguous block region is to be accessed according to a single input/output operation and the namespace comprises two dimensions of logical address space with respective indices for indexing blocks within a corresponding dimension of the logical address space. A first dimensional identifier that identifies a size of the contiguous block region in a first dimension of the namespace is received. A second dimensional identifier that identifies a size of the contiguous block region in a second dimension of the namespace is received. Blocks of the contiguous block region are accessed in response to the single input/output operation according to the starting position, the first dimensional identifier, and the second dimensional identifier.

20 Claims, 6 Drawing Sheets

MULTI-DIMENSIONAL SOLID STATE DRIVE BLOCK ACCESS

BACKGROUND

Solid state drives and related non-volatile storage devices are formed from one or more memory chips, such as NAND flash chips or NOR flash chips. The memory chips generally comprise cells that are arranged in blocks, where a logical block is a smallest unit of data that may be read or written from a controller of the solid state drive. Logical block sizes may be 512 bytes, 1 KiB, 2 KiB, 4 KiB, etc. Current storage devices provide a one dimensional address space to the logical blocks, specifically, a single value for an address that indicates a location of a logical block along a linear memory space. A single input/output (I/O) operation includes two values: a starting address for the operation and a number of blocks to be processed by the operation. As an example, the Non-Volatile Memory Express (NVMe) solid state drive specification defines a logical block address (LBA) and a number of logical blocks (NLB), which are used for locating the blocks in I/O operations, such as read operations, write operations, etc. However, a one-dimensional address space may be limiting in cases of "big data" analysis, for example, when a write operation stores data blocks from different types of records, but a read operation reads different blocks for a same record at a same time. In this latter case, multiple read operations may be needed when the blocks are not sequentially located within a memory chip, resulting in reduced efficiency corresponding to a "random" access read.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to improving access efficiency for solid state drives.

In one aspect, a method for accessing blocks of a solid state drive is provided. The method comprises receiving a starting position that identifies a first block of a contiguous block region within a namespace of the solid state drive to be accessed according to a single input/output operation, where the namespace comprises two dimensions of logical address space with respective indices for indexing blocks within a corresponding dimension of the logical address space. The method further comprises receiving a first dimensional identifier that identifies a size of the contiguous block region in a first dimension of the namespace, and a second dimensional identifier that identifies a size of the contiguous block region in a second dimension of the namespace. The method further comprises accessing blocks of the contiguous block region in response to the single input/output operation according to the starting position, the first dimensional identifier, and the second dimensional identifier.

In another aspect, a system for accessing blocks of a solid state drive is provided. The system comprises one or more NAND memory chips for data storage. The system further comprises a drive storage controller configured to access the one or more NAND memory chips and configure the one or more NAND memory chips with a namespace that comprises two dimensions of logical address space with respective indices for indexing blocks within a corresponding dimension of the logical address space. The drive storage controller is configured to: receive a starting position that identifies a first block of a contiguous block region within the namespace to be accessed according to a single input/output operation; receive a first dimensional identifier that identifies a size of the contiguous block region in a first dimension of the namespace, and a second dimensional identifier that identifies a size of the contiguous block region in a second dimension of the namespace; and access blocks of the contiguous block region in response to the single input/output operation according to the starting position, the first dimensional identifier, and the second dimensional identifier.

In yet another aspect, a non-transient computer-readable storage medium comprising instructions being executable by one or more processors is provided. When executed by the one or more processors, the instructions cause the one or more processors to: receive a starting position that identifies a first block of a contiguous block region within a namespace of a solid state drive to be accessed according to a single input/output operation, wherein the namespace comprises two dimensions of logical address space with respective indices for indexing blocks within a corresponding dimension of the logical address space; receive a first dimensional identifier that identifies a size of the contiguous block region in a first dimension of the namespace, and a second dimensional identifier that identifies a size of the contiguous block region in a second dimension of the namespace; and access blocks of the contiguous block region in response to the single input/output operation according to the starting position, the first dimensional identifier, and the second dimensional identifier.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes various examples of systems and method for accessing data blocks using multi-dimensional addressing. Instead of a one-dimensional address space where a single value indicates a number of blocks to be accessed by an I/O operation, a solid state drive is configured for block access using multiple dimensions, such as first and second dimensions. This allows for access to a contiguous block region within the solid state drive, even when that contiguous block region is not sequential in a single dimension. Generally, a starting position is received, where the starting position identifies a first block of the contiguous block region to be accessed according to a single input/output operation. A first dimensional identifier is received that identifies a size of the contiguous block region in a first dimension, and a second dimensional identifier is received that identifies a size of the contiguous block region in a second dimension. Blocks of the contiguous block region are accessed in response to the single input/output operation according to the starting position, the first dimensional identifier, and the second dimensional identifier.

Figure 1:
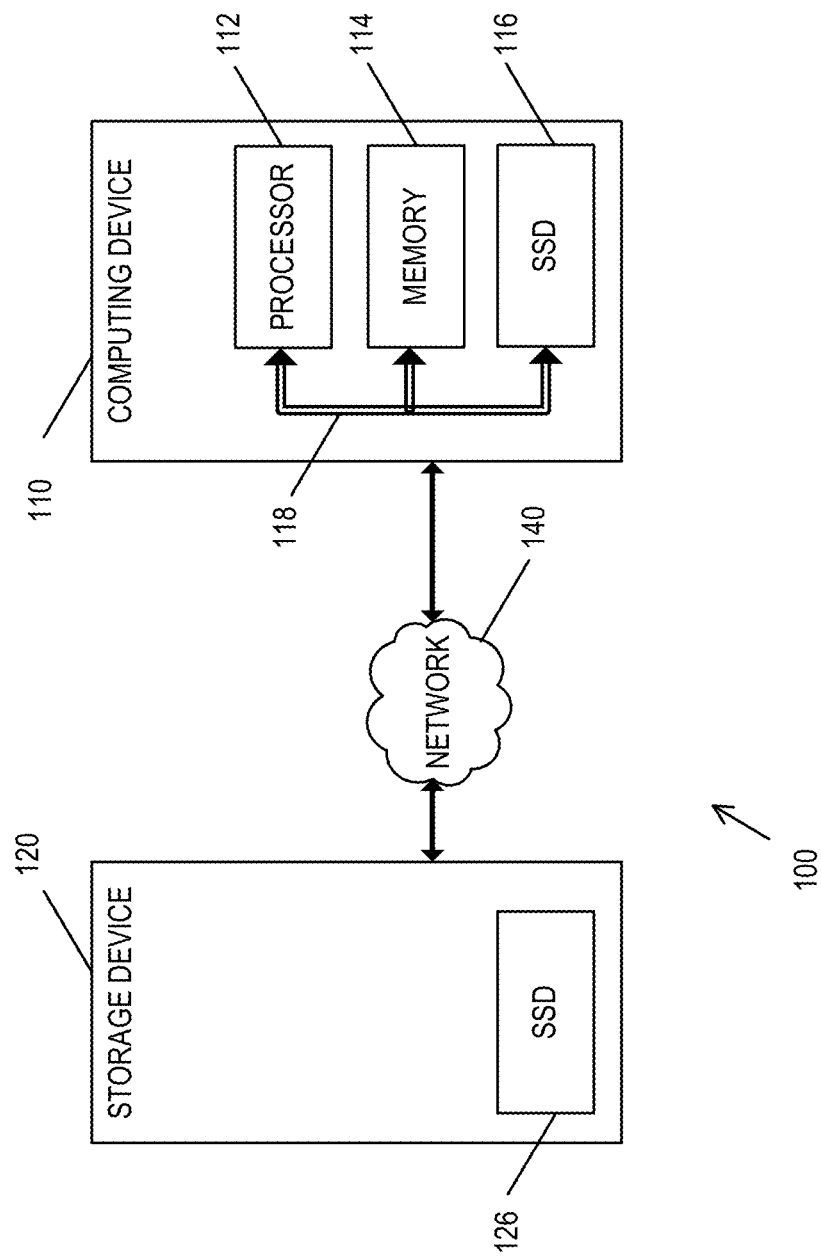
FIG. 1 shows a block diagram of an example of a system configuration for a solid state drive, according to an example embodiment.

This and many further embodiments for a computing device are described herein. For instance, FIG. 1 shows a block diagram of an example of a system configuration for a solid state drive, according to an example embodiment. The system 100 includes a computing device 110 that is configured to access blocks of a solid state drive. The system 100 may also include a storage device 120 that is communicatively coupled with the computing device 110 via a network 140, in some examples.

The computing device 110 may be any type of computing device, including a smartphone, mobile computer or mobile computing device (e.g., a Microsoft® Surface® device, a laptop computer, a notebook computer, a tablet computer such as an Apple iPad™ a netbook, etc.), or a stationary computing device such as a desktop computer or PC (personal computer). The computing device 110 may be configured to communicate with a the storage device 120, for example, using the network 140 (e.g., the Internet, a local area network, etc.). The computing device 110 may be configured to execute one or more software applications (or "applications") and/or services and/or manage hardware resources (e.g., processors, memory, etc.), which may be utilized by users of the computing device 110 or processes running on the computing device 110.

Computing device 110 comprises a processor 112, a memory 114, and a solid state drive (SSD) 116. The processor 112 may be any suitable microprocessor (e.g., x86-64 based processor, ARM based processor) along with suitable memory 114 (e.g., double data rate random access memory, embedded memory). In some examples, the processor 112 is implemented as a system on a chip (SoC), with or without the memory 114. Although not shown, in some examples the processor 112 comprises or communicates with a secondary storage controller or host controller configured to communicate with storage devices, such as the SSD 116. Accordingly, the processor 112 supports one or more logical device interfaces, such as advanced host controller interface (AHCI), non-volatile memory express (NVMe) interface (or non-volatile memory host controller interface specification), or other suitable logical device interface.

The SSD 116 (or semiconductor storage device) is a solid-state storage device that uses integrated circuit assemblies to store data. Generally, the SSD 116 may be used as a secondary storage device for the computing device 110 and may be implemented as a flash memory module, USB memory card, M.2 SSD or other suitable module having one or more NAND flash chips or NOR flash chips. Further details of the SSD 116 are described below with respect to FIG. 2. The processor 112, memory 114, and the SSD 116 are generally communicatively coupled by an interconnect bus 118, such as a Peripheral Component Interconnect Express (PCIe) bus or M-PHY bus. In other examples, the interconnect bus 118 is a serial bus, parallel bus, or other suitable communication bus for sending and receiving data with the SSD 116.

Storage device 120 may include one or more solid state drives 126 or other suitable storage mechanisms (not shown). The solid state drive 126 may generally correspond to the SSD 116, in some examples. The storage device 120 may be a network attached storage device, cloud storage device, or other remotely accessible storage device containing one or more solid state drives, in various examples.

Figure 2:
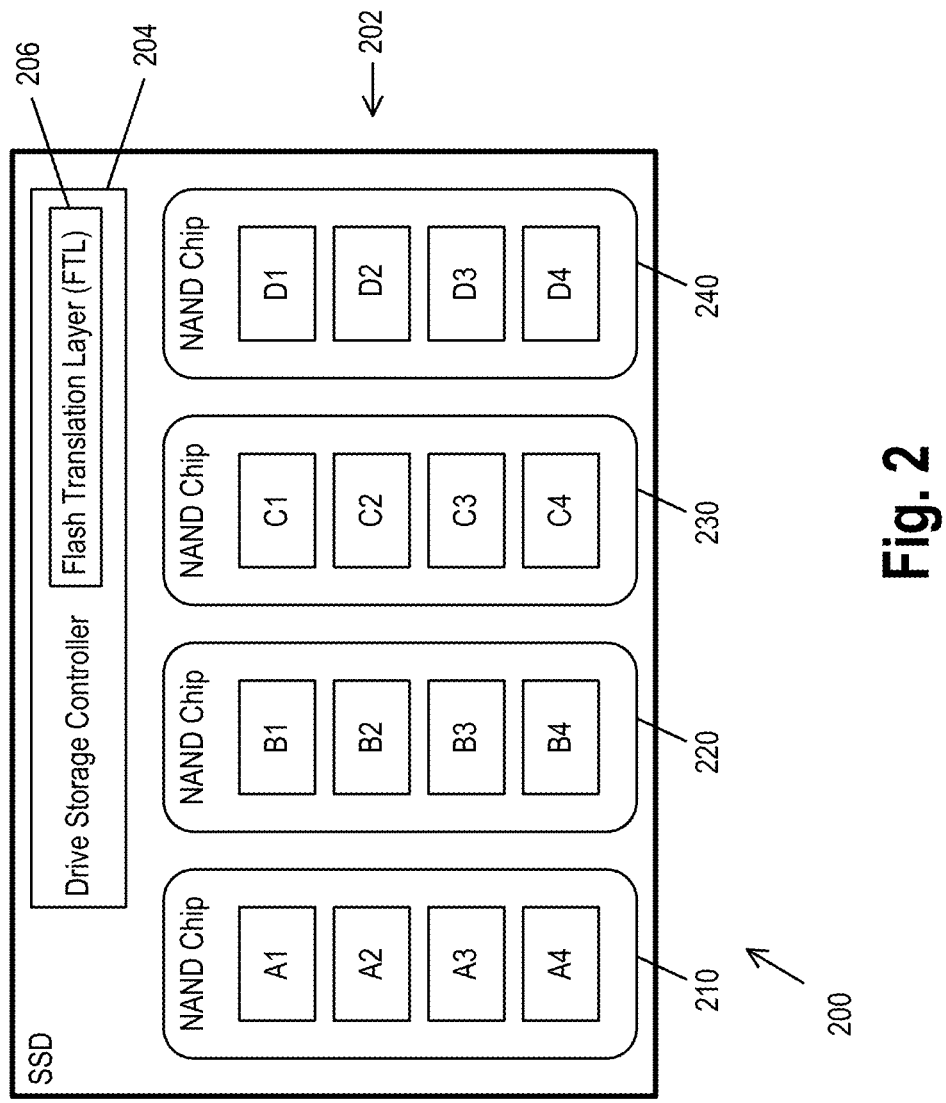
FIG. 2 shows a block diagram of an example of a solid state drive, according to an example embodiment.

FIG. 2 shows a block diagram of an example of a solid state drive (SSD) 200, according to an example embodiment. Generally, the SSD 200 corresponds to the SSD 116 and may be implemented as a hard drive, memory card, universal serial bus (USB) flash drive, embedded storage drive, or other suitable storage device. The SSD 200 comprises one or more memory chips 202 and a drive storage controller 204. In the example shown in FIG. 2, the SSD 200 comprises four NAND flash chips 210, 220, 230, and 240. In other examples, the SSD 200 comprises one, two, three, or more NAND flash chips. Moreover, in some examples, the SSD 200 uses NOR flash chips instead of, or in addition to, the NAND flash chips. The NAND flash chips 210, 220, 230, and 240 generally comprise cells for storing data. Each cell may store one, two, three, or more bits and the cells may be arranged in blocks.

The drive storage controller 204 is configured to access and configure the NAND memory chips 210, 220, 230, and 240 with one or more namespaces, as described herein. In some examples, the features of the drive storage controller 204 are implemented within a flash translation layer 206 of the drive storage controller 204. The flash translation layer (FTL) generally performs logical-to-physical address translation, along with other maintenance tasks such as garbage collection, wear-leveling, bad block management, etc.

The drive storage controller 204 may be a non-volatile memory express (NVMe) controller, universal flash storage (UFS) controller, or other suitable controller for memory chips. Generally, the drive storage controller 204 supports commands that provide access to user data stored on the memory chips using an input/output (I/O) command set. In some examples, the drive storage controller 204 is implemented as one or more primary controllers and one or more secondary controllers that are each dependent upon a primary controller. The drive storage controller 204 may also comprise a cache for operational use. The cache may be implemented as a random access memory module within the drive storage controller 204, as allocated or reserved blocks in the memory chips 202, or a combination thereof, in various examples.

Generally, the drive storage controller 204 is configured to support a multi-dimensional logical address space, for example, a two-dimensional logical address space as described below with respect to FIG. 3, a three-dimensional logical address space, a four-dimensional logical address space, etc. Each dimension has a corresponding index for indexing blocks within that dimension of the logical address space. A two-dimensional logical address space may be modeled as rows and columns where a first index identifies a location of a block in the first dimension (i.e., a row) and a second index identifies a location of a block in the second dimension (i.e., a column), for example. A three-dimensional logical address space may be modeled as rows, columns, and tubes, for example. The drive storage controller 204 generally creates a namespace as a formatted quantity of non-volatile memory that may be directly accessed by a host and comprises one or more logical blocks. A logical block is a smallest unit of data that may be read from or written by the drive storage controller 204. Logical block sizes may be 512 bytes, 1 KiB, 2 KiB, 4 KiB, 8 KiB, or another suitable size, in various examples. Using rows and columns as an example, the individual blocks may be modeled as cells in a table or spreadsheet. In the example shown in FIG. 2, the NAND flash chip 210 comprises four blocks in a single column, labeled as logical blocks A1, A2, A3, and A4, the NAND flash chip 220 comprises four blocks in a single column, labeled as B1, B2, B3, and B4, and so on. Accordingly, the SSD 200 comprises sixteen blocks which may be modeled as a 4×4 table. In contrast to a one-dimensional address space where sixteen blocks may be accessed using a single address (e.g., hexadecimal x00, x01, x02, . . . x0E, x0F), the drive storage controller 204 is configured to use a two-dimensional logical address space and as such, a first dimensional identifier, such as letters A through D, may be used to indicate a column, and a second dimensional identifier, such as number 1 through 4, may be used to indicate a row.

Although the memory chips 202 are shown with only a single column of blocks, the memory chips may have any suitable arrangement of blocks with one or more rows, one or more columns, etc., in other examples. In some examples, the NAND chips may have three dimensions using multiple layers vertically (i.e., 3D NAND chips).

In some examples, the drive storage controller 204 supports multiple input/output (I/O) command sets, for example, an enhanced command set with two-dimensional commands and a legacy command set with one-dimensional commands. In one such example, a first primary controller (not shown) is configured to use two-dimensional commands (i.e., rows and columns) to access the memory chips 202, while a second primary controller (not shown) is configured to use one-dimensional commands (i.e., hexadecimal) to access the memory chips 202. In another example, a single primary controller is configured to use both one-dimensional and two-dimensional command sets.

Figure 3:
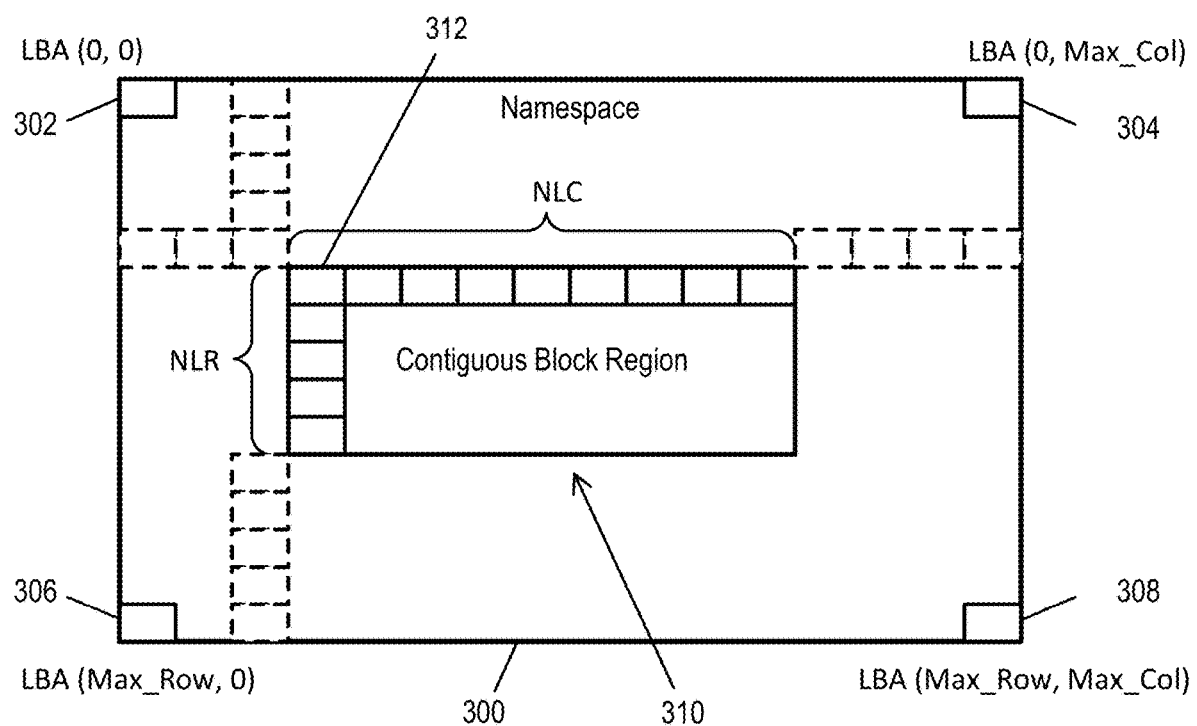
FIG. 3 shows a diagram of an example namespace of a solid state drive for two-dimensional access, according to an example embodiment.

FIG. 3 shows a diagram of an example namespace 300 of a solid state drive for two-dimensional access, according to an example embodiment. The namespace 300 may be mapped to all or some of the blocks within the SSD 200, for example, by the drive storage controller 204. As will be appreciated by those skilled in the art, the SSD 200 may be configured with one, two, three, or more namespaces in various examples or scenarios. Moreover, the SSD 200 may be configured with only two-dimensional (or multi-dimensional) namespaces, or both one-dimensional and multi-dimensional namespaces, in various examples or scenarios.

In the example shown in FIG. 3 and described herein, the drive storage controller 204 is implemented as an NVMe-compatible drive storage controller and configures the namespace 300. In other words, the drive storage controller 204 uses and/or supports commands that are similar or based upon commands in the NVM Express Base Specification (see nvmexpress.org). Example commands or data structures that may be modified to support multi-dimensional logical address spaces comprise the starting logical block address (SLBA), number of logical blocks (NLB), or namespace size (NSZE) field. Other commands may be used in different implementations of the drive storage controller 204 (e.g., in the case of AHCI).

For the namespace 300, a first logical block address (LBA) for a block 302 may be LBA(0, 0), corresponding to a tuple representing row 0 and column 0. Similarly, a last LBA for a block 308 may be LBA(Max_Row, Max_Col) where Max_Row indicates a maximum size (i.e., number of rows) of the namespace 300 in the first dimension and Max_Col indicates a maximum size (i.e., number of columns) of the namespace 300 in the second dimension. Accordingly, a block 304 may have LBA(0, Max_Col) and a block 306 may have LBA(Max_Row, 0). As shown in FIG. 3, Max_Col is 15 (i.e., 16 total columns) and Max_Row is 15 (i.e., 16 total rows).

With namespace 300 as described herein, a read operation, write operation, format operation, or other suitable operation may refer to a contiguous block region. For example, instead of a starting LBA in hexadecimal, a starting address for a contiguous block region may have a starting row LBA (SRLBA) and a starting column LBA (SCLBA). In the example shown in FIG. 3, the contiguous block region 310 has a starting address of (5,3). Moreover, instead of a number of logical blocks (NLB), the operation may refer to a tuple representing a number of logical rows (NLR) and a number of logical columns (NLC). For example, the contiguous block region 310 has an NLR of 5 and an NLC of 9. In this way, a read operation may correspond to a command of READ((5, 3), (5, 9)) where (5,3) denotes the starting address, (5, 9) denotes a number of rows and columns to be read from the starting address.

In some examples, various operations may further include an access order, indicating whether operations within the contiguous block region should be performed in a row-first manner or column-first manner. Using the block names shown in FIG. 2, a row-first manner would be A1, B1, C1, D1, A2, etc. while a column-first manner would be A1, A2, A3, A4, B1, etc.

With namespace 300 as described herein, a namespace size (NSZE) field may indicate the total size of the namespace 300 as a total size in rows and columns (Max_Row, Max_Col) instead of in a number of logical blocks (LBA 0 through n−1, for example).

In some examples, the drive storage controller 204 receives a plurality of I/O operations from an application, operating system, driver, etc. that provides a one-dimensional address for several operations of a same type (e.g., read operations, write operations). In one example, the drive storage controller 204 converts multiple I/O operations of the same type into a single I/O operation using the two-dimensional logical block address commands. Using the example of FIG. 2, read operations such as READ(B1), READ(B2), READ(B3) may be converted into a single read operation as READ(B1, (1, 3)) for a read operation starting at block B1 and continuing for 1 column and 3 rows. Other conversions of operations will be apparent to those skilled in the art. In some examples, an SSD driver (e.g., SSD driver 621) of an operating system or application module converts multiple I/O operations of the same type into a single I/O operation using the two-dimensional logical block address commands. The SSD driver 621 may then provide the converted commands to the drive storage controller 204. In other examples, the SSD driver provides an interface that comprises two-dimensional logical block address commands to other application modules.

Using the two-dimensional logical address space of the namespace 300, multiple write commands may be written across different rows, but with related records aligned in a same column. This approach allows for a single read operation, vertically across a single column, to access the related records, which saves the operational costs of multiple random accesses and improves performance of the SSD 200.

Figure 4:
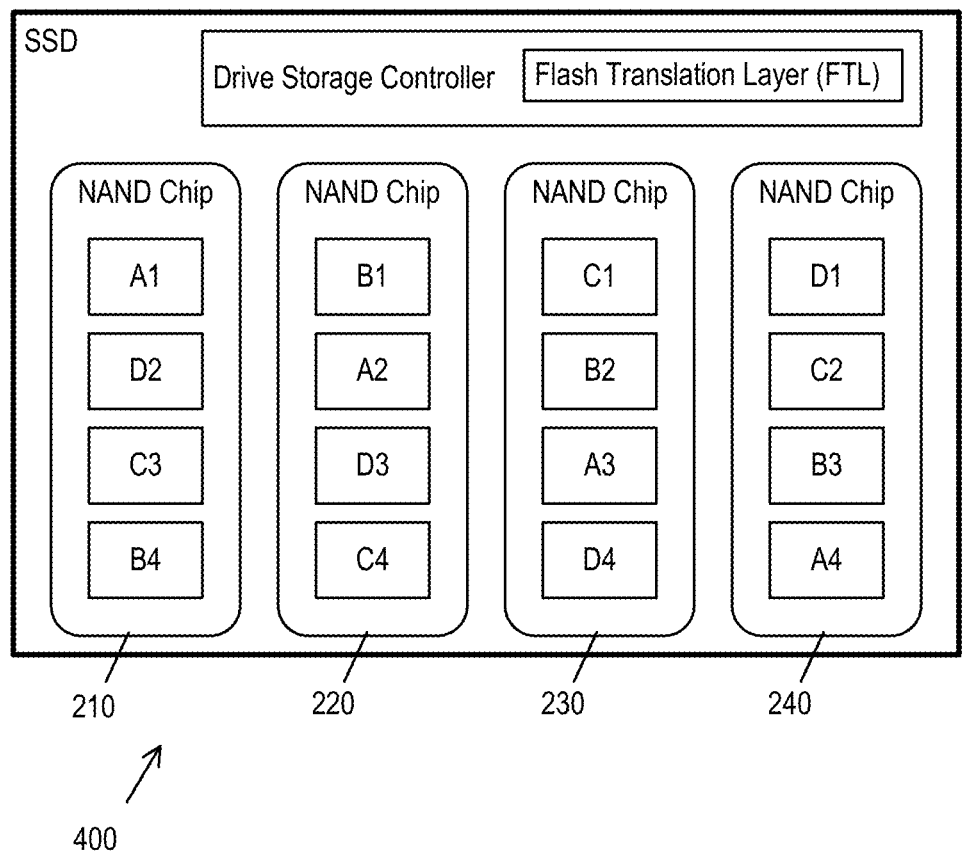
FIG. 4 shows a diagram of an example logical to physical mapping for two-dimensional access, according to an example embodiment.

FIG. 4 shows a diagram of an example logical to physical mapping for two-dimensional access of an SSD 400, according to an example embodiment. The SSD 400 generally correspond to the SSD 200, but with updated block identifiers showing a mapping of the logical blocks shown in FIG. 2 onto physical blocks of the memory chips 210, 220, 230, and 240. For example, a horizontal READ((0,0), (1, 4)) operation using the logical address space in FIG. 2 would read a single row as A1, B1, C1, and D1. This operation corresponds to a horizontal read from physical blocks A1, B1, C1, and D1, from memory chips 210, 220, 230, and 240, respectively. However, a horizontal READ((1,0), (1, 4)) operation using the logical address space in FIG. 2 would read a single row as A2, B2, C2, and D2. This operation corresponds to a horizontal read from physical blocks D2, A2, B2, C2, from memory chips 210, 220, 230, and 240, respectively. Although the physical blocks are read out of sequential order, they may be read simultaneously because they are located on different chips. Generally, the mapping from the logical address space to physical address space of FIG. 4 corresponds to an offset of a column index by an amount of the row index. Specifically, the offset of the column index is 0 for the first row, 1 for the second row (shifting the physical location one chip to the right), 2 for the second row (shifting the physical location two chips to the right), etc. Other variations in offset will be apparent to those skilled in the art, such as an offset of the row index by an amount of the column index, offsets in a different direction, etc. In some examples, the offset is dynamically determined when configuring a namespace.

The mapping shown in FIG. 4 indicates that a vertical READ((0,0), (4,1)) operation using the logical address space in FIG. 2 would read a single column as A1, A2, A3, and A4. This operation corresponds to a vertical read from physical blocks A1, A2, A3, and A4 from memory chips 210, 220, 230, and 240, respectively. Advantageously, the physical blocks may be read simultaneously because they are located on different chips, instead of each block being located on the first memory chip 210.

Figure 5:
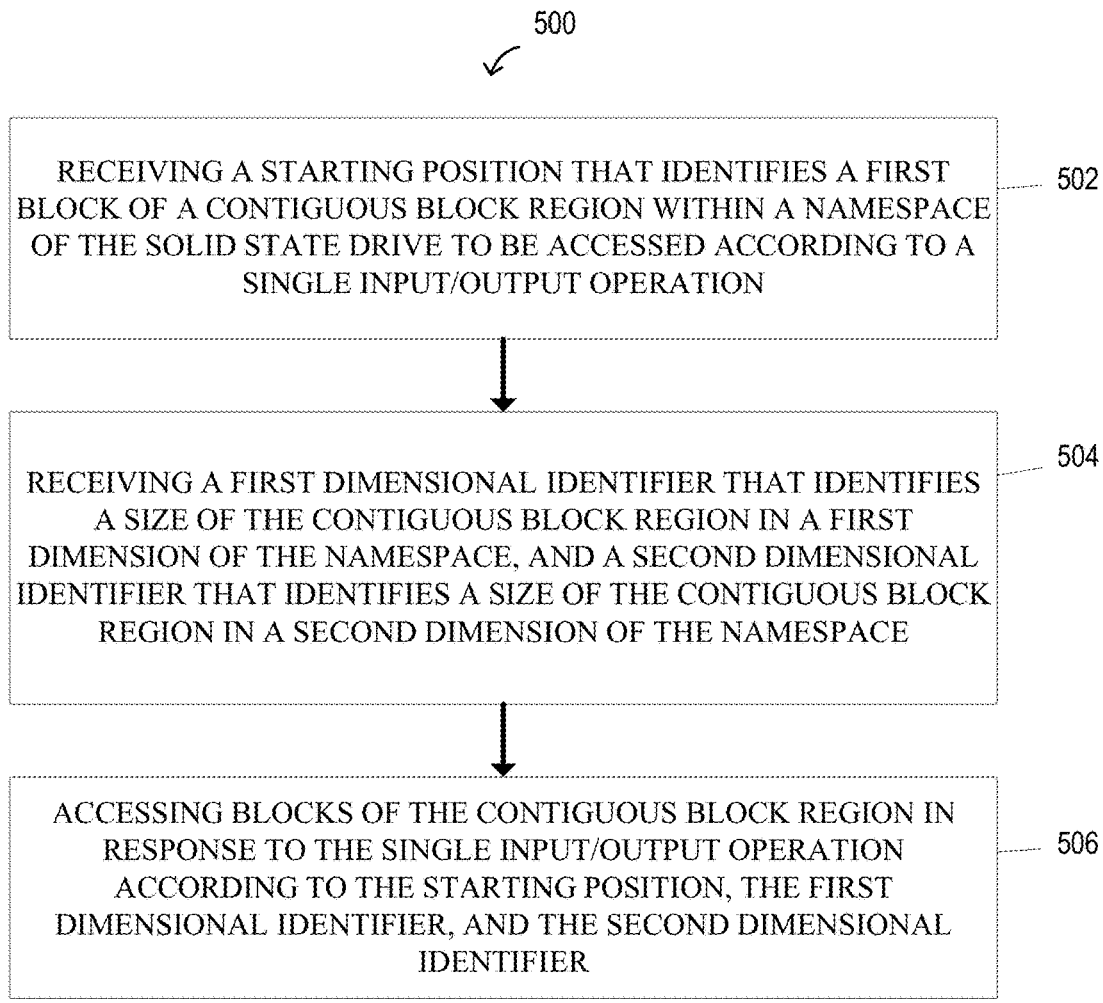
FIG. 5 shows a flowchart of an example method of accessing blocks of a solid state drive, according to an example embodiment.

FIG. 5 shows a flowchart of an example method of accessing blocks of a solid state drive, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 5. Steps may be performed serially, in a partially overlapping manner, or fully in parallel. Thus, the order in which steps of method 500 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 5 may be performed by the computing device 110 (e.g., via the drive storage controller 204), an SSD controller 618 (FIG. 6), or other suitable computing device.

Method 500 begins with step 502. At step 502, a starting position is received that identifies a first block of a contiguous block region within a namespace of the solid state drive to be accessed according to a single input/output operation. The namespace comprises two dimensions. The starting position may be a tuple such as (5, 3) for the block 312 for the namespace 300 shown in FIG. 3, received by the drive storage controller 204.

At step 504, a first dimensional identifier that identifies a size of the contiguous block region in a first dimension of the namespace is received, and a second dimensional identifier that identifies a size of the contiguous block region in a second dimension of the namespace is received. For example, the drive storage controller 204 may receive a tuple for a number of logical rows (NLR) and a number of logical columns (NLC).

At step 506, blocks of the contiguous block region are accessed in response to the single input/output operation according to the starting position, the first dimensional identifier, and the second dimensional identifier. For example, the drive storage controller 204 may perform a read operation, write operation, format operation, or other suitable operation on the contiguous block region 310.

In some examples, the method 500 further comprises receiving an access order that prioritizes one of the first dimension or the second dimension, and accessing each of the blocks of the block region in the prioritized dimension from the first block before accessing remaining blocks of the contiguous block region. For example, the drive storage controller 204 may receive an access order indicating a row-first or column-first manner of accessing the blocks of the contiguous block region 310.

In some examples, the starting position comprises a 2-tuple having a first index that identifies a location of the first block in the first dimension and a second index that identifies the location of the first block in the second dimension. For example, the first index indicates a number of rows and the second index indicates a number of columns to find the starting position. As one example, block 312 has a 2-tuple of (5,3) indicating its position at the sixth row and fourth column using a 0-based address (i.e., (0,0) indicating a first block of the namespace).

In some examples, the starting position comprises a single value that identifies the location of the first block, the method further comprising mapping the single value to the first dimension using an integer division operation (i.e., where fractional remainders are omitted from the result) and to the second dimension using a modulo operation. For example, the block 312 may be identified by a single value of 83 (in decimal) or x53 (in hexadecimal) because an integer division of 83 by the row size (16 based on a Max_Col of 15) is 5 (corresponding to the sixth row) and a modulo operation of 83 by 16 (83 Mod 16) is 3 (corresponding to the fourth column).

In some examples, the single input/output operation comprises one of reading data from each block of the block region or writing data from each block of the block region.

In some examples, the method 500 further comprises: receiving a request for identification of the namespace; and providing a response to the request for identification that indicates a maximum size of the namespace in the first dimension and a maximum size of the namespace in the second dimension. In some examples, the response is an NSZE field that defines the maximum space of the namespace, for example, as a tuple of (16, 16) for decimal or a tuple of (x0F, x0F) for hexadecimal representing 16 rows and 16 columns.

In some examples, the single input/output operation comprises formatting at least a portion of the solid state drive to configure the namespace with the size of the contiguous block region. In one such example, the size of the contiguous block region is different from a prior configuration of the namespace. For example, a namespace with a size of 16 rows by 16 columns may be resized to have 8 rows by 32 columns (maintaining a same capacity but different configuration). In other examples, the namespace may be resized to have a larger or smaller capacity, according to available space on the solid state drive.

In some examples, the namespace comprises three dimensions of logical address space where three indices are used to index blocks within the logical address space. In one such example, the method 500 further comprises: receiving a third dimensional identifier that identifies a size of the contiguous block region in a third dimension of the namespace. Accessing blocks of the block region comprises accessing the blocks of the contiguous block region according to the starting position, the first dimensional identifier, the second dimensional identifier, and the third dimensional identifier. In some examples, three dimensions are utilized when the memory chips 202 are implemented as 3D NAND chips. For three dimensions, a 3-tuple may represent rows, columns, and tubes (or width, depth, layer, etc.), generally corresponding to X, Y, and Z coordinates for indexing the blocks within the logical address space.

Figure 6:
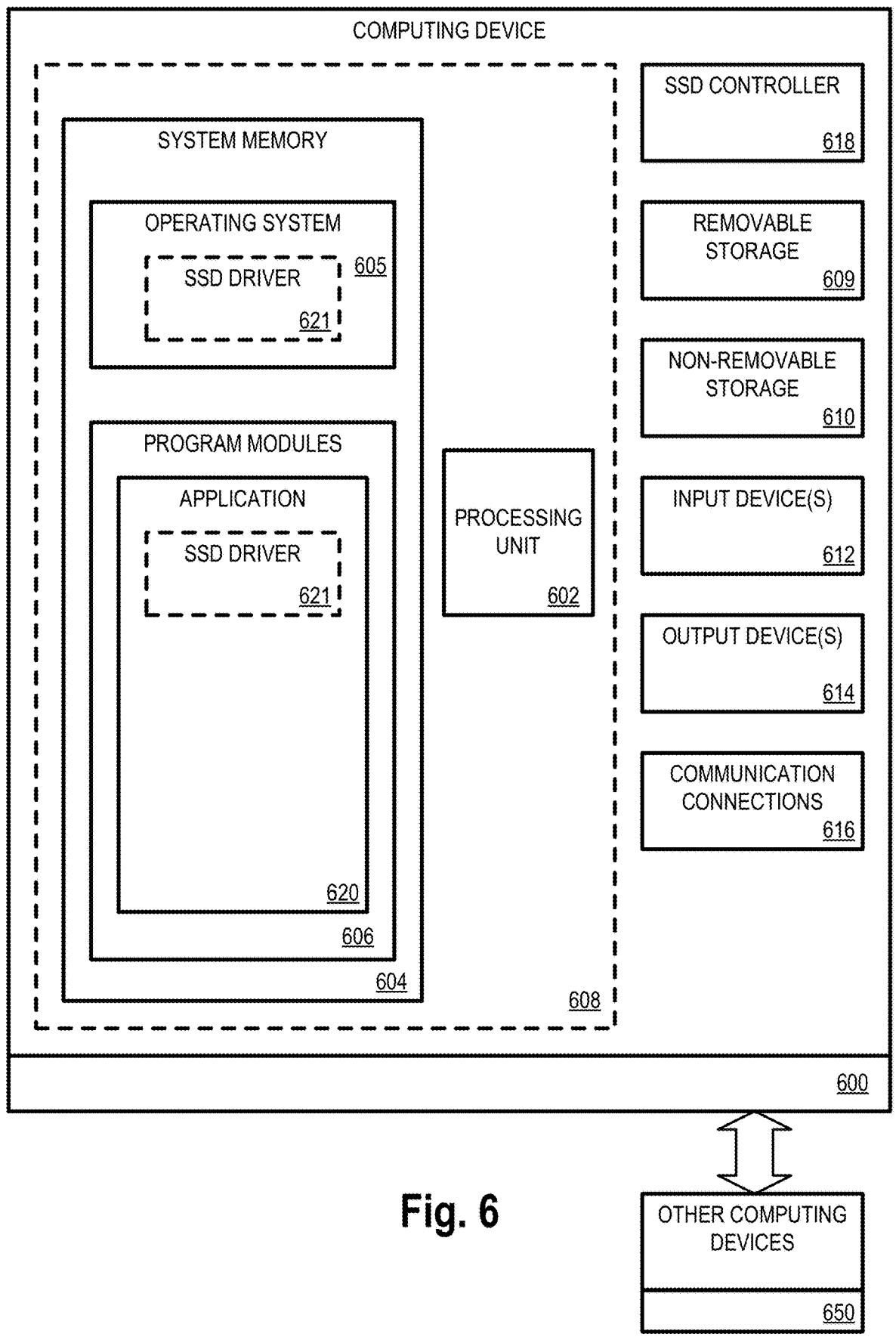
FIG. 6 is a block diagram illustrating example physical components of a computing device with which aspects of the disclosure may be practiced.

FIG. 6 and the associated descriptions provide a discussion of a variety of operating environments in which aspects of the disclosure may be practiced. However, the devices and systems illustrated and discussed with respect to FIG. 6 are for purposes of example and illustration and are not limiting of a vast number of computing device configurations that may be utilized for practicing aspects of the disclosure, as described herein.

FIG. 6 is a block diagram illustrating physical components (e.g., hardware) of a computing device 600 with which aspects of the disclosure may be practiced. The computing device components described below may have computer and/or processor executable instructions for implementing a drive access application 620 on a computing device (e.g., computing device 110, storage device 120), including computer and/or processor executable instructions for drive access application 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running drive access application 620, such as one or more components with regard to FIGS. 1 and 3 and, in particular, SSD driver 621 (e.g., corresponding to a driver for drive storage controller 204). As shown in FIG. 6, the SSD driver 621 may be implemented as a portion of the operating system 605, a portion of the application 620, or a combination thereof, in various embodiments.

The operating system 605, for example, may be suitable for controlling the operation of the computing device 600 and communication with removable storage 609 and/or non-removable storage 610. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610. The computing device 600 may comprise an SSD controller 618, for example, a processor or other suitable integrated circuit, configured for communications with the storage devices 609 and/or 610. In some examples, the SSD controller 618 is executed by processors within the computing device 600, for example, at an interface between the processing unit 602 (or more generally, configuration 608) and the removable storage device 609 and/or the non-removable storage device 610 (e.g., at a PCIe interface). In some examples, the SSD controller 618 communicates with the drive storage controller 204 of the SSD 200 and/or a similar drive storage controller (not shown) of the removable storage 609 or non-removable storage 610.

As stated above, a number of program modules and data files may be stored in the system memory 604. While executing on the processing unit 602, the program modules 606 (e.g., drive access application 620) may perform processes including, but not limited to, the aspects, as described herein. Other program modules that may be used in accordance with aspects of the present disclosure, and in particular for accessing blocks of a solid state drive, may include SSD driver 621.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for accessing blocks of a solid state drive, the method comprising:
    receiving a starting position that identifies a first block of a contiguous block region within a namespace of the solid state drive to be accessed according to a single input/output operation, wherein the namespace comprises two dimensions of a logical address space with respective indices for indexing blocks within a corresponding dimension of the logical address space;
    receiving a first dimensional identifier that identifies a size of the contiguous block region in a first dimension of the namespace and a second dimensional identifier that identifies a size of the contiguous block region in a second dimension of the namespace;
    accessing the blocks of the contiguous block region in response to the single input/output operation according to the starting position, the first dimensional identifier, and the second dimensional identifier;
    receiving an access order that prioritizes one of the first dimension or the second dimension; and
    accessing each of the blocks of the contiguous block region in the prioritized dimension from the first block before accessing remaining blocks of the contiguous block region.

2. The method of claim 1, further comprising:
    mapping the logical address space onto a physical address space of the blocks.

3. The method of claim 1, wherein the starting position comprises a 2-tuple having a first index that identifies a location of the first block in the first dimension and a second index that identifies the location of the first block in the second dimension.

4. The method of claim 1, wherein the starting position comprises a single value that identifies a location of the first block, the method further comprising mapping the single value to the first dimension using an integer division operation and to the second dimension using a modulo operation.

5. The method of claim 1, wherein the single input/output operation comprises one of reading data from each block of the contiguous block region or writing data from each block of the contiguous block region.

6. The method of claim 5, the method further comprising:
    receiving a request for identification of the namespace; and
    providing a response to the request for identification that indicates a maximum size of the namespace in the first dimension and a maximum size of the namespace in the second dimension.

7. The method of claim 1, wherein the single input/output operation comprises formatting at least a portion of the solid state drive to configure the namespace with the size of the contiguous block region.

8. The method of claim 7, wherein the size of the contiguous block region is different from a prior configuration of the namespace.

9. The method of claim 1, wherein the namespace comprises three dimensions, the method further comprising receiving a third dimensional identifier that identifies a size of the contiguous block region in a third dimension of the namespace; wherein accessing blocks of the contiguous block region comprises accessing the blocks of the contiguous block region according to the starting position, the first dimensional identifier, the second dimensional identifier, and the third dimensional identifier.

10. A system for accessing blocks of a solid state drive, the system comprising:
    one or more NAND memory chips for data storage;
    a drive storage controller configured to access the one or more NAND memory chips and configure the one or more NAND memory chips with a namespace that comprises two dimensions of a logical address space with respective indices for indexing blocks within a corresponding dimension of the logical address space;

wherein the drive storage controller is configured to:
receive a starting position that identifies a first block of a contiguous block region within the namespace to be accessed according to a single input/output operation;
receive a first dimensional identifier that identifies a size of the contiguous block region in a first dimension of the namespace, and a second dimensional identifier that identifies a size of the contiguous block region in a second dimension of the namespace;
access the blocks of the contiguous block region in response to the single input/output operation according to the starting position, the first dimensional identifier, and the second dimensional identifier;
receive an access order that prioritizes one of the first dimension or the second dimension; and
access each of the blocks of the contiguous block region in the prioritized dimension from the first block before accessing remaining blocks of the contiguous block region.

11. The system of claim 10, wherein the drive storage controller is configured to:
map the logical address space onto a physical address space of the blocks.

12. The system of claim 10, wherein the starting position comprises a 2-tuple having a first index that identifies a location of the first block in the first dimension and a second index that identifies the location of the first block in the second dimension.

13. The system of claim 10, wherein the single input/output operation comprises one of reading data from each block of the contiguous block region or writing data from each block of the contiguous block region.

14. The system of claim 13, wherein the drive storage controller is configured to:
receive a request for identification of the namespace; and
provide a response to the request for identification that indicates a maximum size of the namespace in the first dimension and a maximum size of the namespace in the second dimension.

15. The system of claim 10, wherein the single input/output operation comprises formatting at least a portion of the solid state drive to configure the namespace with the size of the contiguous block region, wherein the size of the contiguous block region is different from a prior configuration of the namespace.

16. A non-transient computer-readable storage medium comprising instructions being executable by one or more processors, that when executed by the one or more processors, cause the one or more processors to:
receive a starting position that identifies a first block of a contiguous block region within a namespace of a solid state drive to be accessed according to a single input/output operation, wherein the namespace comprises two dimensions of a logical address space with respective indices for indexing blocks within a corresponding dimension of the logical address space;
receive a first dimensional identifier that identifies a size of the contiguous block region in a first dimension of the namespace, and a second dimensional identifier that identifies a size of the contiguous block region in a second dimension of the namespace;
access the blocks of the contiguous block region in response to the single input/output operation according to the starting position, the first dimensional identifier, and the second dimensional identifier;
receive an access order that prioritizes one of the first dimension or the second dimension; and
access each of the blocks of the contiguous block region in the prioritized dimension from the first block before accessing remaining blocks of the contiguous block region.

17. The computer-readable storage medium of claim 16, wherein the instructions are executable by the one or more processors to cause the one or more processors to:
map the logical address space onto a physical address space of the blocks.

18. The computer-readable storage medium of claim 16, wherein the starting position comprises a 2-tuple having a first index that identifies a location of the first block in the first dimension and a second index that identifies the location of the first block in the second dimension.

19. The computer-readable storage medium of claim 16, wherein the single input/output operation comprises one of reading data from each block of the contiguous block region or writing data from each block of the contiguous block region.

20. The computer-readable storage medium of claim 19, wherein the instructions are executable by the one or more processors to cause the one or more processors to:
receive a request for identification of the namespace; and
provide a response to the request for identification that indicates a maximum size of the namespace in the first dimension and a maximum size of the namespace in the second dimension.

* * * * *